United States Patent
Butt et al.

(10) Patent No.: US 6,928,051 B2
(45) Date of Patent: Aug. 9, 2005

(54) APPLICATION BASED BANDWIDTH LIMITING PROXIES

(75) Inventors: Alan B. Butt, Orem, UT (US); David A. Eatough, Provo, UT (US); Tony N. Sarra, Herriman, UT (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 09/737,947

(22) Filed: Dec. 18, 2000

(65) Prior Publication Data

US 2002/0110084 A1 Aug. 15, 2002

(51) Int. Cl.[7] .............................................. H04L 12/26
(52) U.S. Cl. ...................... 370/230; 709/226; 709/228
(58) Field of Search ................ 370/230, 231, 370/235, 468, 477, 471, 389, 392, 395.21

(56) References Cited

U.S. PATENT DOCUMENTS

| | | | | | |
|---|---|---|---|---|---|
| 6,324,177 | B1 | * | 11/2001 | Howes et al. | 370/389 |
| 6,466,984 | B1 | * | 10/2002 | Naveh et al. | 709/228 |
| 6,473,793 | B1 | * | 10/2002 | Dillon et al. | 709/223 |
| 6,563,824 | B1 | * | 5/2003 | Bhatia et al. | 370/392 |
| 6,628,668 | B1 | * | 9/2003 | Hutzli et al. | 370/468 |
| 2001/0024452 | A1 | * | 9/2001 | Liu et al. | 370/468 |
| 2001/0030970 | A1 | * | 10/2001 | Wiryaman et al. | 370/401 |
| 2003/0067940 | A1 | * | 4/2003 | Edholm | 370/468 |
| 2004/0081093 | A1 | * | 4/2004 | Haddock et al. | 370/230 |

* cited by examiner

*Primary Examiner*—Frank Duong
*Assistant Examiner*—Michael J. Moore, Jr.
(74) *Attorney, Agent, or Firm*—Kacvinsky LLC

(57) ABSTRACT

Embodiments of application based bandwidth limiting proxy servers are described.

27 Claims, 3 Drawing Sheets

APPLICATION BASED BANDWIDTH LIMITING PROXIES

FIELD

The invention generally relates to computers and computer networks and in particular to the use of application based bandwidth limiting proxy servers in a network.

BACKGROUND

A network typically includes one or more switches or processing nodes coupled together via one or more communication links. Networks currently allow network proxy servers to forward requests. A proxy server accepts the request and then acts on the requester's behalf to forward the request to the destination server. The request may be passed through one or more network proxy servers until that request reaches its destination.

In many situations, there may be a need to limit the usage of bandwidth within a network. A number of techniques have been used to limit the use of available bandwidth in a network or across a specific link in a network, including limiting bandwidth at the clients and by limiting bandwidth at a proxy server. With respect to the first technique, each client may control its own usage of bandwidth at certain times of the day or when the network becomes busy, etc. However, because each client is operating independently, network congestion can still occur due to cumulative usage, especially during periods when many clients are downloading large files. Proxies (or proxy servers) also have been used to limit the use of bandwidth. However, proxy servers have provided an inflexible approach to limiting bandwidth. Proxy servers typically limit bandwidth on the basis of a protocol that is used or an address in a packet. More flexibility is desirable for limiting the use of bandwidth.

DETAILED DESCRIPTION

Figure 1:
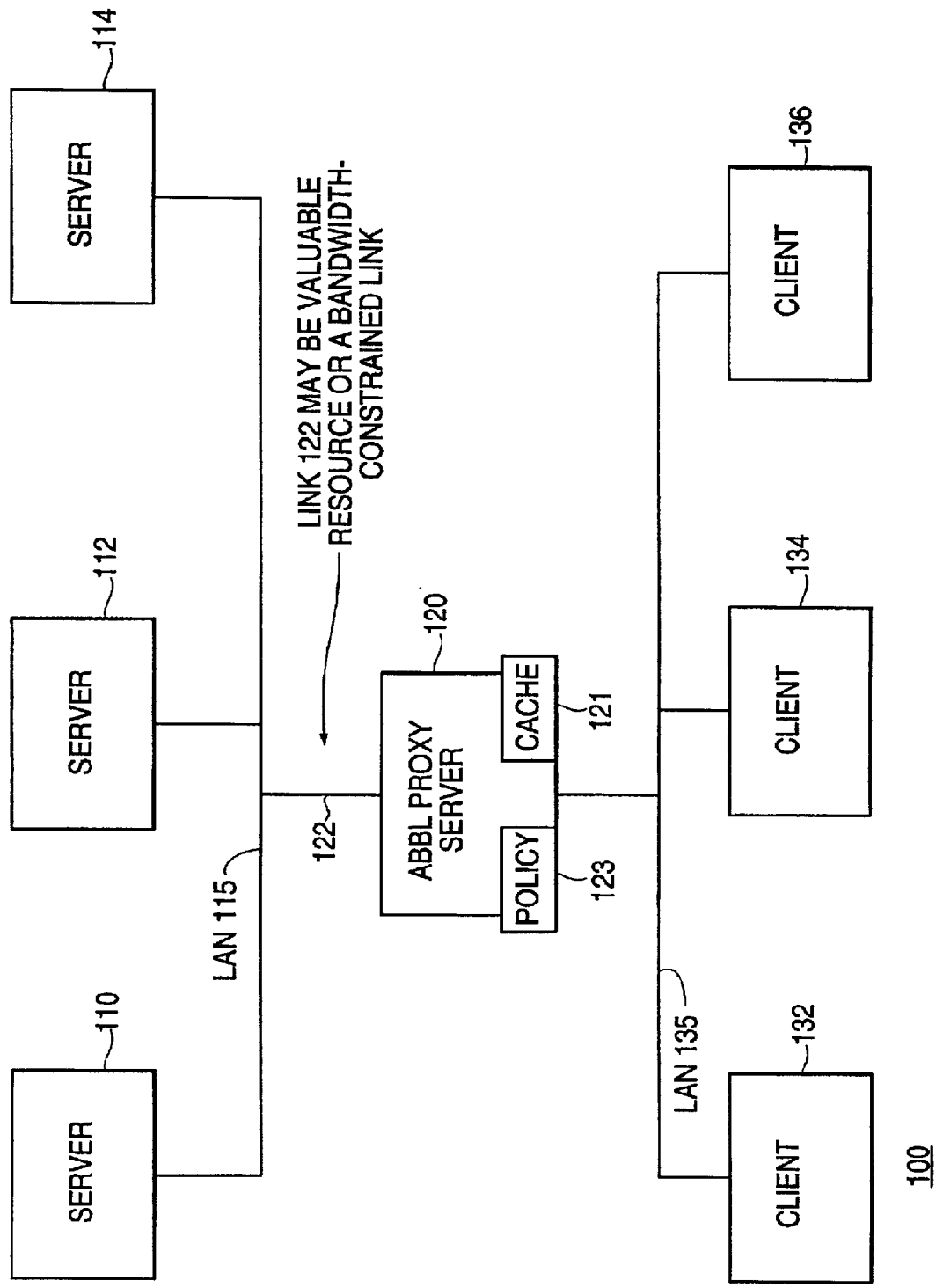
FIG. 1 is a block diagram illustrating a network according to an example embodiment.

Referring to the Figures wherein like numerals indicate like elements, FIG. 1 is a block diagram illustrating an example network 100 according to an example embodiment. Servers 110, 112 and 114 are connected together on Local Area Network (LAN) 115. Several clients, including clients 132, 134 and 135 are connected together over a LAN 135. Each client and server includes one or more applications running thereon. Clients 132, 134 and 136 may issue requests to servers 110, 112 and 114 using a variety of different protocols. For example client 132 may include a network management application that issues packets or requests to one of the servers in order to perform network management functions. Clients 134 and 136 may include a web browser and E-mail applications which may also send requests or information to one of the servers. The applications running on clients 132, 134 and 136 may communicate with the servers 110,112 and 114 using Hypertext Transfer Protocol (HTTP)—HTTP/1.1, Request For Comments 2616, June 1999, as protocol, for example. Other communication protocols can be used such as File Transfer Protocol (FTP), Request For Comments 959, October, 1985, etc. Each client and/or application may use the same or different communication protocols.

The network 100 of FIG. 1 also includes an application based bandwidth limiting (ABBL) proxy server 120. ABBL proxy server 120 accepts requests and then acts on the requester's behalf to forward the request to a destination, similar to a standard proxy server. However, in addition, ABBL proxy server 120 receives all the requests from the clients 132–136 and, according to an example embodiment described in greater detail below, implements a bandwidth limiting policy based on the type of traffic (or packets) or the type of application that generated the traffic. An example policy is shown in FIG. 1 as policy 123. According to one embodiment, a policy is a set of rules, procedures or principles that govern operation. According to an embodiment, ABBL proxy server 120 forwards requests while limiting bandwidth usage according to the rules or procedures of the policy.

ABBL proxy server 120 is coupled to servers 110–114 via a communications link 122. ABBL proxy server 120 is also coupled to clients 132–136. According to an example embodiment, communications link 122 may be considered to be a valuable resource. For example, link 122 may be a bandwidth-constrained or bandwidth limited link, which may be considered to have a lower bandwidth or capacity than other portions or other links in the network 100 in FIG. 1. Or, alternatively, link 122 may be a bottleneck or receive a disproportionately higher portion of the traffic in the network due to its location or the network topology, etc. As a result, in certain situations, it may be desirable to limit the use of the available bandwidth of the network 100. In particular, it may be desirable to throttle or limit the use of the bandwidth of link 122, for the reasons noted above. In the example network shown in FIG. 1, all clients can access the servers only through link 122. Thus, in this example, link 122 is a bottleneck and use of bandwidth for link 122 should preferably be managed carefully because it may be a valuable resource.

ABBL proxy server 120 includes a cache 121 for storing or caching response messages in order to reduce the response time and network bandwidth consumption from future equivalent requests, for example, requests for the same information. In general, when a request is received at the ABBL proxy server 120 from a client, the ABBL proxy server responds with the requested information or message if such information is stored in cache 121. Otherwise, if the ABBL proxy server 120 itself cannot process the request, the request is forwarded to servers 110,112 and 114 for processing. In a similar manner, ABBL proxy server 120 can receive requests from servers 110,112 and 114 and either process the request or forward the request to clients 132,134 and 136 for processing.

According to an embodiment, ABBL proxy server 120 implements an ABBL (or bandwidth-limiting) policy to manage or limit the use of bandwidth over link 122. Because the ABBL proxy server 120 is located in series with the link 122 which provides the only path connecting servers 110–114 to clients 132–136, all traffic, such as packets or messages, sent between the servers and the clients must pass through the ABBL proxy 120, according to the example embodiment shown in FIG. 1.

According to an example embodiment, ABBL proxy server 120 receives all the requests from the clients 132–136 and implements a bandwidth limiting policy based on the type of traffic or packets or the type of application that generated the traffic. For example, network management applications on a client generate network management traffic. E-mail applications generate E-mail traffic, for example, sending E-mail messages and attached files, and web browsers generate web browser traffic, such as requests for web pages from web servers. By having all requests received and processed at a central point, the ABBL proxy 120 in FIG. 1 can ensure that the total transmitted data does not exceed a predetermined bit rate. Moreover, according to the ABBL policy, ABBL proxy server 120 can operate to limit the transmission of data for certain types of traffic, while allowing other types of traffic to pass through without being throttled, or limited.

For example, in some instances, network management functions can overwhelm a network with traffic and messages if left unlimited or unmanaged. Therefore, according to an example embodiment, the ABBL proxy server 120 limits the transmission of network management traffic or messages from network management applications over the link 122 to a predetermined percentage of network bandwidth. For example, ABBL proxy server may limit network management traffic to a maximum of 10% of the available bandwidth of link 122 or available link data rate of network link 122 during periods when the network or link 122 is busy.

There are several different ways in which ABBL proxy server 120 can throttle or limit the transmission of traffic in the network based on the type of traffic or the type of application that generated the traffic. According to an example embodiment, the ABBL proxy server 120 may bandwidth limit, or throttle, or manage the various types of traffic based on the destination port specified in the traffic or packets. For example, a packet header usually specifies a source address and port number and a destination address and port number.

Certain port numbers may be well known port numbers. These well known port numbers are default numbers that identify specific applications that should process the packet. For example, port number 80 frequently is used to identify HTTP traffic. However, there is no requirement that these predetermined or well known port numbers be used in packets or messages.

Therefore, according to an example embodiment, a port number provided in a packet is used to identify that packet as being generated or sent by a corresponding application. Therefore, some packets or messages transmitted in the network will specify a destination port number corresponding to a type of traffic or corresponding to the application that generated the traffic. These application based port numbers are independent of the communications protocol that is used to transport the message or packet. The following example is illustrative:

TABLE 1

| Port Number(s) | Application or Type of Traffic |
| --- | --- |
| 80, 911 | Regular traffic (not bandwidth limited in this example) |
| 950 | Net. Management - Alerts (High Priority) |
| 951 | Net. Management - day-to-day Net. Management (Med. Priority) |
| 952 | Net. Management - Software Deployment or Distribution (Low Priority) |

As shown in Table 1, regular (unthrottled) traffic, such as non-management traffic in the example, corresponds to ports 80 and 911. The regular traffic is unmanaged (not bandwidth limited or throttled), and could include messages or packets from web browsers and messages from E-mail applications, etc. in this example. Ports 950–952 correspond to network management traffic or messages or packets from one or more network management applications. In order to prevent the network management applications running on one or more of clients 132–136 from congesting the network or blocking access to the communications link 122, the ABBL proxy server 120 can limit or throttle network management traffic to a maximum predetermined percentage of bandwidth or available data rate, for example, during periods of network traffic or usage.

According to an example bandwidth limiting policy, the network management traffic may be bandwidth limited to 10% of the network bandwidth during certain periods. Within this 10% of the bandwidth allocated to the network management traffic, the policy implemented by the ABBL proxy server 120 may allocate specific percentages to specific types of management traffic. According to another example embodiment, traffic corresponding to each of ports 950, 951 and 952 could each be allocated approximately 3–4% of the network bandwidth or data rate of link 122, collectively using no more than 10% as required.

Alternatively, within the 10% bandwidth available to network management traffic, the ABBL proxy server 120 may prioritize different kinds of network management traffic or prioritize traffic from different types of network management applications. For example, as shown in table 1, network management traffic from alert applications, for example, for detecting problems in the network and alerting an application running on a server of the problem corresponds to port 950 and is given the highest priority among the network management applications or among the network management type of traffic because it may be necessary to process the alert immediately. Network management traffic from applications handling the day-to-day network management functions correspond to port 951 and are assigned a medium priority by ABBL proxy server 120. Network management traffic from applications performing software deployment or distributing software upgrades correspond to port 952. In this example, the network management traffic for software deployment is assigned the lowest priority of all the network management types of traffic because software deployment is typically less urgent than the other types of management functions, and may use a higher percentage of bandwidth. The port numbers, such as 950–952, mentioned above and used as an example basis to prioritize traffic are typically provided as destination port numbers in the packet, but source port numbers may be used instead.

Table 1 illustrates just one example of how traffic from different types of applications can be assigned to different port numbers. This allows the ABBL proxy server 120 to then selectively throttle or bandwidth limit traffic from specific applications regardless of the source or destination addresses or protocols used to transport the traffic or messages. These are just two example ABBL policies. ABBL proxy 120 can implement a wide variety of policies.

In operation of network 100 (FIG. 1), packets are received by the ABBL proxy server 120 from one or more applications, for example, from clients 132–136. ABBL proxy server may be listening on a group of ports, including ports 80, 911 and 950–952, as examples. If a packet is received that specifies a destination port of 80 or 911, this indicates that the message or packet is regular (unthrottled) traffic, such as, from E-mail application or from a web browser in this example. According to an example embodiment, the ABBL proxy server 120 then establishes a connection with the requesting application, and then begins receiving and storing or queuing the packets of the regular (unthrottled) traffic. The ABBL proxy server 120 may then establish another connection with a destination server, such as with one of servers 110–114, and then forwards the received packets to the destination server without throttling or limiting the data transmission rate for ports 80 and 911 output from the ABBL proxy server 120.

On the other hand, when the ABBL proxy server 120 receives a packet from a network management application, the packet will include port number 950, 951 or 952 in the destination port field of the packet. The ABBL proxy server 120 can establish a connection with the requesting management application and begins receiving and storing (queuing) packets. The ABBL proxy server 120 also can establish a connection with a destination server and begins transmitting the packets to the destination server. However, when the data transmission rate for these packets from this network management application reaches a predetermined value, such as reaches a predetermined data rate or bandwidth usage, the ABBL proxy 120 will throttle or decrease the rate of packet transmission over the link 122 to the destination server in order to limit the bandwidth usage or data rate to the specified value, as specified by the ABBL policy implemented by the ABBL proxy server 120. If too many packets are received, the queue at ABBL proxy 120 may eventually overflow or lose packets, and the ABBL proxy server 120 may then send a negative acknowledgement (NAK) back to the management application to indicate that certain packets should be resent. The ABBL proxy server could also use protocol specific flow control messages to indicate that fewer packets should be sent. Thus, the ABBL proxy server 120 can throttle or decrease the output transmission of traffic from certain types of applications (indicated by port number) according to the ABBL policy. Flow control can be exercised by the ABBL proxy server 120 sending NAK messages or other messages back to the requesting client (or the requesting node which could be the server as well).

The ABBL proxy server 120 may also collectively throttle or limit traffic from a group of management applications so that the collective or cumulative data transmission rate output from the ABBL proxy server over link 122 is less than a predetermined value. The ABBL proxy server 120 could throttle traffic from applications of the same type (e.g., all day-to-day network management applications) or could throttle or bandwidth limit different types of network management applications.

The ABBL proxy also has the ability to retrieve files from the local cache 121. If the ABBL proxy has the file in the cache it can send the information to the client without having to use link 122. The ABBL proxy 120 has the ability to place information into local cache 121 whenever information is downloaded across link 122.

For example, client 132 requests file A from server 110 using the ABBL proxy server 120. If file A was in the local cache 121, the files would be sent by the proxy server 120 to client 132 without requesting the information from server 110 using link 122.

In another example, client 132 requests file A from server 110 using the ABBL proxy server 120. File A is not in the local cache 121, the ABBL proxy server 120 obtains file A from server 110. In addition to sending the file to client 132 file A is stored in the local cache 121 of the ABBL proxy server. If at some latter point client 134 requests file A from server 110 using the ABBL proxy server 120, file A would be sent from the local cache 121 of the ABBL proxy server 120.

The ABBL proxy 120 can use well known industry techniques for determining if the information in the local cache 121 is out of date and need to be updated.

Additionally the information in the local cache 121 can be put there using multicast, broadcast, pull, or pull based methods. By placing data into the local cache 121 prior to any client requests the need to access link 122 when a client needs the data is eliminated.

Another embodiment of filling the cache is defining the data that must be in the local cache 121 of the ABBL proxy server 120, this definition is then used to ensure that the local cache is synchronized with the various data sources.

Figure 2:
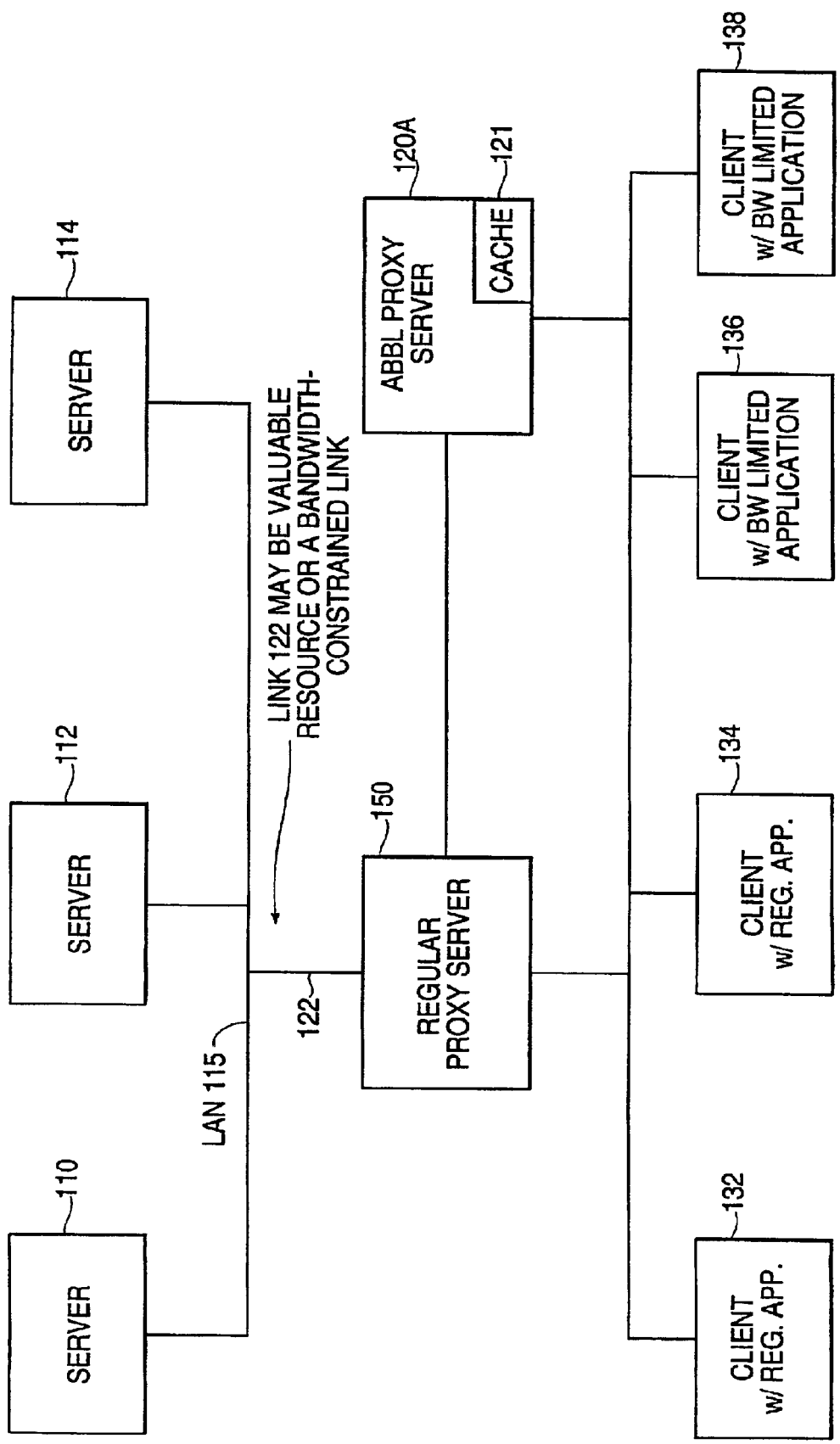
FIG. 2 is a block diagram illustrating a network according to another example embodiment.

FIG. 2 is a block diagram illustrating an example network 200 according to another example embodiment. Network 200 includes a LAN 115 having servers 110–114. Clients 132 and 134 include regular applications (e.g., applications which generate traffic which will not be throttled or bandwidth limited in this example), and clients 136 and 138 which include applications that will be bandwidth limited or throttled by ABBL proxy server 120A (such as network management applications). A regular proxy server 150 is coupled between the servers and clients. Regular proxy server 150 listens for connection requests on destination ports corresponding to regular traffic (i.e., traffic which is not limited or throttled). According to an example, ports 80 and 911 are two ports which correspond to regular (i.e., unthrottled) traffic or which correspond to the applications that generate the regular traffic. Thus, the regular proxy server 150 can establish connections to with applications sending traffic or packets to destination ports corresponding to regular (unthrottled) traffic (destination ports 80 and 911). According to an example embodiment, regular proxy server 150 does not listen for traffic on ports 950–952, which corresponds to traffic from network management applications. As a result, regular proxy server 150 does not perform any application based bandwidth limiting or throttling. Those ABBL functions are left to the ABBL proxy server 120A.

As shown in FIG. 2, all four clients (132–138) are coupled to both regular proxy server 150 and to ABBL proxy server 120A. As noted above, regular proxy server 150 does not grant connection requests to clients 136 or 138 to receive throttled or bandwidth limited traffic. This traffic on ports 950–952 (to be throttled or bandwidth limited) from network management applications is ignored by regular proxy server 150. Regular proxy server 150 only receives and forwards regular traffic (traffic received on ports 80 or 911 in this example).

On the other hand, ABBL proxy server 120A will grant or establish connections only from the traffic to be throttled or bandwidth limited (corresponding to ports 950–952), while ignoring traffic or connection requests provided from regular (unthrottled) applications (corresponding to ports 80 and 911 in this example). In this example, the ABBL proxy server 120A establishes connections to receive packets or traffic only from the network management applications. These network management applications identify their packets (and indicate their desire to have their traffic throttled by server 120A) by using destination ports 950–952.

The arrangement shown in FIG. 2 allows an ABBL proxy server 120A to be added to a regular or standard proxy server 150 in a network, without requiring modifications to regular proxy server 150. This allows the ABBL proxy server 120A to be plugged into the network to implement a configurable ABBL policy to throttle or bandwidth limit the traffic from specific applications. The applications to be throttled or managed need to use the destination port number(s) understood by the ABBL proxy server 120A as corresponding to traffic to be throttled. This arrangement allows the ABBL proxy server 120A to throttle traffic only from specific types of applications (e.g., network management applications in this example) without inhibiting the transmission of traffic from other types of applications over regular proxy server 150.

In operation, the ABBL proxy server 120A generally receives network management traffic from client applications using the corresponding ports, and then forwards the network management traffic according to an ABBL policy to the regular proxy server 150 for transmission over link 122. Thus, in the network 200 of FIG. 2, the ABBL proxy server 120A must go through the regular proxy server 150 to get across link 122. In particular, traffic from network management applications use one of the corresponding destination ports, port numbers 950–952 in the packet headers for network management traffic. The network management packets are received and stored by the ABBL proxy server 120A. For each packet, the ABBL proxy server 120A changes the destination port number from 950–952 to one of the regular port numbers (e.g., 80, 911, which correspond to regular traffic) and then transmits or outputs the packets to the regular proxy server 150. The ABBL proxy server 120A will output or transmit the packets according to the ABBL policy (i.e., data transmission rate for network management traffic not to exceed the predetermined value). Because the regular proxy server 150 is listening or will establish connections received on regular ports 80 and 911, the regular proxy server 150 will establish a connection with the ABBL proxy server 120A to receive the network management packets, and will then forward the network management packets over link 122 to the servers without throttling. Only the ABBL proxy server 120A throttles or limits the transmission rate of the network management packets. According to this example embodiment, the regular proxy server 150 typically does not distinguish between regular traffic and network management traffic and typically does not implement an ABBL policy.

ABBL proxy server 120A in FIG. 2 is a client-side ABBL proxy server because it is connected to the LAN 135 (or network portion) on the client side. With the client-side ABBL proxy server, the advantages are the traffic from the clients can be throttle or bandwidth limited before being transmitted over link 122, and without creating additional overhead for the regular traffic. The disadvantage of adding the client-side ABBL proxy server 120A is that the network management traffic will travel over the client LAN 135 twice, but will pass over the link 122 only once. Thus, additional traffic will be created on the client LAN 135. Another disadvantage of the arrangement in FIG. 2 is that regular traffic cannot be throttled by server 120A.

The servers 110, 112 and 114 in network 200 (FIG. 2) can also initiate network management traffic to be sent to the clients 132–138. Thus, the servers can act as clients. The only way to throttle or bandwidth limit this traffic from the servers is to place a server-side ABBL proxy server on the server LAN 115. Even providing the server-side ABBL proxy server and using the ports corresponding to the traffic to be throttled, at least some of the network management traffic, including the connection requests, unfortunately will pass over the link 122 twice.

Figure 3:
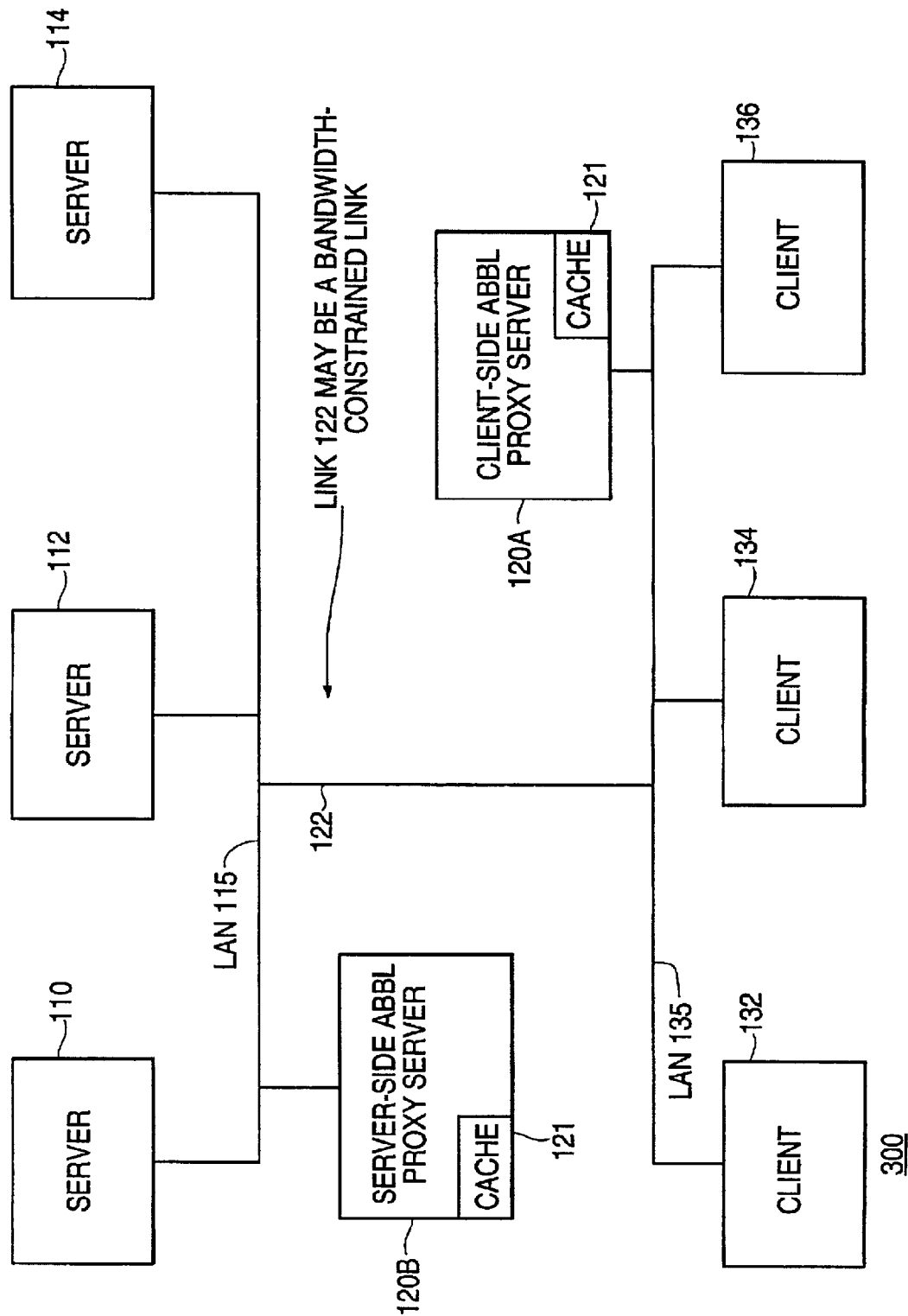
FIG. 3 is a block diagram illustrating a network according to a further example embodiment.

FIG. 3 is a block diagram illustrating an example network 300 according to a further example embodiment. In the network 300 shown in FIG. 3, there is no regular proxy server. In network 300, clients and servers can communicate directly with each other over link 122. It may be desirable in this network to throttle or bandwidth limit the usage of link 122, at least for traffic from certain types of applications, such as network management applications as an example. Therefore, in this example network 300, a client-side ABBL proxy server 120A is coupled to the client LAN 135, and a server-side proxy server 120B is coupled to the server LAN 115. The network 300 may use one or both of the ABBL proxy servers 120A and 120B.

Both ABBL proxy servers 120A and 120B are designed to receive and bandwidth limit traffic that uses or specifies destination ports in the packet headers corresponding to the throttled applications (e.g., ports 950–952), while ignoring all other traffic, such as ignoring the regular traffic on ports 80 and 911. This allows regular applications, which may be specified by using regular destination ports such as 80 and 911, to communicate directly over the link 122, without being limited or throttled by ABBL proxy servers 120.

According to an example embodiment, the ABBL proxy servers 120A and 120B listen to establish connections to receive only packets from network management applications, specified by destination ports 950–952, from their respective LAN. In other words, the client-side ABBL proxy server 120A receives packets from network management applications running on the clients 132–136. While server-side proxy server 120B receives packets from management applications running on the servers 110–114. These packets are temporarily stored or queued by the ABBL proxy server 120 and then transmitted over the link 122 according to the ABBL policy implemented by that ABBL proxy server, For example, the transmission of network management packets across link 122 will not exceed the predetermined value according to the ABBL policy.

The advantages of the client-side ABBL proxy server 120A in this network 300 are that specific types of traffic, such as network management traffic for example, can be throttled without inhibiting or placing overhead on the remaining (unthrottled) traffic. However, if an application is to be bandwidth managed or throttled, the application must use the appropriate port numbers, such as port numbers 950–952, as destination ports in the packet headers in order for the ABBL proxy server 120A to receive the packets and then throttle or bandwidth limit such traffic.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
   receiving a packet at a forwarding device, the packet specifying a port number corresponding to an application to be bandwidth limited; and
   forwarding the packet according to a bandwidth limiting policy;
   wherein the bandwidth limiting policy comprises an application based bandwidth limiting policy that throttles or limits the use of bandwidth by one or more types of applications.

2. The method of claim 1 and further comprising the forwarding device changing the port number from the port number corresponding to an application to be bandwidth limited to another port number prior to forwarding the packets.

3. The method of claim 2 wherein said another port number comprises a port number corresponding to regular traffic that is not bandwidth limited.

4. A method comprising:
receiving a packet;
forwarding the packet according to a bandwidth limiting policy if the packet is a first type of packet; and
forwarding the packet without bandwidth limiting if the packet is a second type of packet;
wherein the bandwidth limiting policy comprises an application based bandwidth limiting policy that throttles or limits the use of bandwidth by one or more types of applications.

5. The method of claim 4 wherein the type of packet is detected based on a destination port number of the packet.

6. The method of claim 4 wherein the first type of packet is indicated based on a first destination port number in the packet, and the second type of packet is indicated by a second destination port number in the packet.

7. A method comprising:
receiving a packet; detecting whether or not the packet was sent by an application to be bandwidth limited;
forwarding the packet without bandwidth limiting if the packet was sent by an application that is not to be bandwidth limited; and
otherwise, if the packet was sent by an application to be bandwidth limited, then forwarding the packet according to an application based bandwidth limiting policy;
wherein the bandwidth limiting policy comprises an application based bandwidth limiting policy that throttles or limits the use of bandwidth by one or more types of applications.

8. The method of claim 7 wherein the receiving a packet comprises a proxy server receiving the packet.

9. The method of claim 7 wherein the detecting whether or not the packet was sent by an application to be bandwidth limited comprises detecting a port number in the packet corresponding to a type of application to be bandwidth limited.

10. The method of claim 9 and further comprising changing the port number in the received packet from the port number corresponding to a type of application to be bandwidth limited to a regular port number prior to forwarding the packet.

11. An apparatus comprising a storage readable media having instructions stored thereon, the instructions resulting in the following when executed:
receiving a packet, the packet specifying a port number corresponding to an application to be bandwidth limited; and
forwarding the packet according to a bandwidth limiting policy;
wherein the bandwidth limiting policy comprises an application based bandwidth limiting policy that throttles or limits the use of bandwidth by one or more types of applications.

12. The apparatus of claim 11 wherein the instructions further result in the following when executed:
changing the port number from the port number corresponding to an application to be bandwidth limited to another port number prior to forwarding the packets.

13. The apparatus of claim 12 wherein the instructions further result in the following when executed:
receiving a second packet specifying a port number corresponding to an application not to be bandwidth limited; and forwarding the packet without using the bandwidth limiting policy.

14. An apparatus comprising a storage readable media having instructions stored thereon, the instructions causing the following to be performed when executed:
receiving a packet;
determining a type of application that sent the packet;
forwarding the packet according to a bandwidth limiting policy if the packet is sent by a first type of application; and
forwarding the packet without bandwidth limiting if the packet is from a second type of application;
wherein the bandwidth limiting policy comprises an application based bandwidth limiting policy that throttles or limits the use of bandwidth by one or more types of applications.

15. The apparatus of claim 14 wherein the determining comprises determining a type of application that sent the packet based on a port number in the packet.

16. The apparatus of claim 15 wherein the determining comprises determining a type of application that sent the packet based on a destination port number in the packet.

17. An apparatus comprising a server to grant a connection request received for a destination port number corresponding to a type of application to be bandwidth limited, and to reject a connection request for a destination port number which does not correspond to the type of application to be bandwidth limited, the server to forward any received packets after granting the connection request according to an application based bandwidth limiting policy, wherein the bandwidth limiting policy comprises an application based bandwidth limiting policy that throttles or limits the use of bandwidth by one or more types of applications.

18. The apparatus of claim 17 wherein the server comprises a server to forward the packets while limiting bandwidth usage based on requirements or rules of the policy.

19. The apparatus of claim 17 wherein the server comprises an application based bandwidth limiting server.

20. An apparatus comprising a server to receive a packet and detect a type of application that sent the packet from examining the packet, to forward the packet without bandwidth limiting or throttling the packet if the packet was sent from a first type of application, and to forward the packet according to a bandwidth or throttling policy if the packet was sent from a second type of application; wherein the bandwidth policy comprises an application based bandwidth policy that throttles or limits the use of bandwidth by one or more types of applications.

21. The apparatus according to claim 20 wherein the apparatus detects the type of application that sent the packet on the basis of a destination port number in the packet.

22. The apparatus of claim 20 wherein the first type of application is a regular type of application that is not to be bandwidth limited or throttled by a proxy server, while the second type of application comprises one or more types of applications that are to be bandwidth limited or throttled according to the bandwidth limiting policy; wherein the bandwidth limiting policy comprises an application based bandwidth limiting policy that throttles or limits the use of bandwidth by one or more types of applications.

23. The apparatus of claim 20 wherein the server comprises an application based bandwidth limiting proxy server.

24. An apparatus comprising:
a non-limiting forwarding device coupled between first and second groups of applications to receive and forward packets;
a limiting forwarding device coupled to the first group of applications to receive a packet and to detect whether the packet was sent by an application to be bandwidth limited, and then to forward the packet to the non-limiting forwarding device according to an application based bandwidth limiting policy if the packet was sent by an application to be bandwidth limited;

wherein the bandwidth limiting policy comprises an application based bandwidth limiting policy that throttles or limits the use of bandwidth by one or more types of applications.

25. The apparatus of claim 24 wherein the limiting forwarding device comprises an application based bandwidth limiting proxy server.

26. An apparatus comprising:

a bandwidth limiting policy;

a proxy server to respond to requests and forward messages;

a local memory to store response messages, the proxy server to respond to requests with messages from the local memory if available, otherwise to retrieve a requested message from another server and then forward the message according to a bandwidth limiting policy;

wherein the bandwidth limiting policy comprises an application based bandwidth limiting policy that throttles or limits the use of bandwidth by one or more types of applications.

27. The apparatus of claim 26 wherein the local memory comprises a cache.

* * * * *

UNITED STATES PATENT AND TRADEMARK OFFICE
CERTIFICATE OF CORRECTION

PATENT NO. : 6,928,051 B2  
DATED : August 9, 2005  
INVENTOR(S) : Butt et al.

It is certified that error appears in the above-identified patent and that said Letters Patent is hereby corrected as shown below:

Column 1,  
Line 66, after "as", insert -- a communication --.

Column 4,  
Line 12, after "of", insert -- high --.

Signed and Sealed this

Twenty-ninth Day of November, 2005

JON W. DUDAS  
*Director of the United States Patent and Trademark Office*